(12) United States Patent
Matsubara et al.

(10) Patent No.: US 7,298,058 B2
(45) Date of Patent: Nov. 20, 2007

(54) REMOTE CONTROL ENGINE STARTING DEVICE FOR VEHICLE

(75) Inventors: Manabu Matsubara, Kobe (JP); Minoru Yoshimura, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 474 days.

(21) Appl. No.: 10/754,009

(22) Filed: Jan. 8, 2004

(65) Prior Publication Data
US 2005/0001483 A1 Jan. 6, 2005

(30) Foreign Application Priority Data
Jan. 15, 2003 (JP) .............................. 2003-007253

(51) Int. Cl.
*H01H 47/00* (2006.01)
*B60R 25/04* (2006.01)

(52) U.S. Cl. .................. 307/10.5; 307/10.4; 307/10.6; 340/426.11; 340/426.12; 340/426.13; 340/426.16; 340/426.17

(58) Field of Classification Search ............... 307/10.4, 307/10.5; 123/179.2; 340/426.11, 426.12, 340/426.13, 426.16, 426.17
See application file for complete search history.

(56) References Cited

U.S. PATENT DOCUMENTS

| 5,684,338 | A | * | 11/1997 | Linton et al. ............... 307/10.2 |
| 5,708,307 | A | * | 1/1998 | Iijima et al. ................. 307/10.5 |
| 5,818,330 | A | * | 10/1998 | Schweiger ............. 340/426.13 |
| 5,912,512 | A | | 6/1999 | Hayashi et al. |
| 5,973,411 | A | * | 10/1999 | Tado et al. ................. 307/10.5 |
| 6,043,752 | A | * | 3/2000 | Hisada et al. ............... 340/5.26 |
| 6,188,140 | B1 | * | 2/2001 | Kito et al. .................. 307/10.4 |
| 6,788,189 | B2 | * | 9/2004 | Kikkawa et al. ......... 340/426.1 |
| 6,816,059 | B2 | * | 11/2004 | Yanaka ....................... 340/5.72 |

FOREIGN PATENT DOCUMENTS

| JP | 8-150902 | | 6/1996 |
| JP | 10-81201 | | 3/1998 |
| JP | 2002293216 | A * | 10/2002 |

OTHER PUBLICATIONS

Patent Abstract of Japan, Publication No. 08150902 A, Published on Jun. 11, 1996, in the name of Asaga.

* cited by examiner

*Primary Examiner*—Michael Sherry
*Assistant Examiner*—Hal I Kaplan
(74) *Attorney, Agent, or Firm*—Christie, Parker & Hale, LLP (57) ABSTRACT

A remote control engine starting device includes an immobilizer and a remote engine starter for staring an engine when an engine start command is given from a remote location. The immobilizer further includes an interrogating signal outputting section, which outputs an interrogating signal when a signal related to engine starting is received, and an engine start permitting section, which gives engine start permission when a remote engine starter code that the remote engine starter outputs in response to the interrogating signal matches a remote engine starter verifying code preregistered in the immobilizer. The remote engine starter further includes an engine start signal outputting section, which outputs a signal related to engine starting, and a code outputting section, which in response to the interrogating signal, outputs the remote engine starter code preregistered in the remote engine starter.

8 Claims, 11 Drawing Sheets

Fig.4B
ENGINE STARTING BY KEY INSERTION

Fig.4A
REMOTE ENGINE STARTING

IG KEY INSERTION SIGNAL
IG ON SIGNAL
ACTIVATION SIGNAL
KEY CODE
INTERROGATING SIGNAL
RESPONSE SIGNAL

REMOTE CONTROL ENGINE STARTING DEVICE FOR VEHICLE

CROSS-REFERENCE TO RELATED APPLICATION

This application claims priority of Japanese Patent Application Number 2003-007253, filed on Jan. 15, 2003.

BACKGROUND OF THE INVENTION

1. Field of the Invention

The present invention relates to a remote control engine starting device for a vehicle equipped with an immobilizer having an anti-theft capability and, more particularly, to a remote control engine starting device for remotely starting an engine while ensuring enhanced security for the vehicle.

2. Description of the Related Art

Remote control engine starting devices for starting vehicle engines by remote control have been commercially implemented in recent years. On the other hand, an increasing number of vehicles come equipped with an anti-theft function known as the immobilizer. The immobilizer works as follows. A chip having a unique key code is embedded in an ignition (IG) key and, when an engine start operation such as the insertion or turning of the key in an IG key cylinder is detected, the key code is read from the key, and an immobilizer controller compares the thus readout key code with a prestored legitimate code, and permits engine control only when they match. Accordingly, if an attempt is made to start the engine by using a key other than the legitimate key, the engine control system does not operate because the key codes do not match and, therefore, the engine cannot be started, thus preventing theft.

When a remote control engine starting device is installed in a vehicle equipped with an immobilizer function, the engine cannot be started remotely unless the immobilizer is disarmed. To solve this problem, Japanese Unexamined Patent Publication No. H08-150902 discloses a system in which when a remote engine start command is received from a legitimate transmitter, the remote control engine starting device issues a request signal to the immobilizer which, in response to the request signal, issues a permit signal to the engine controller.

On the other hand, Japanese Unexamined Patent Publication No. H10-81201 discloses a system which, while ensuring security such as theft prevention, allows the engine or the like to be started not only by the use of a legitimate vehicle key but also by an operation from a remote location.

SUMMARY OF THE INVENTION

It is an object of the present invention to provide a remote control engine starting device for a vehicle equipped with an immobilizer function, wherein security for the vehicle is further enhanced.

According to the present invention, there is provided a remote control engine starting device having an immobilizer and a remote engine starter and equipped with a remote engine starting function for starting an engine when an engine start command is given from a remote location, wherein the immobilizer comprises an interrogating signal outputting section which outputs an interrogating signal when a signal related to engine starting is received, and an engine start permitting section which gives engine start permission when a remote engine starter code, that the remote engine starter outputs in response to the interrogating signal, matches a remote engine starter verifying code preregistered in the immobilizer, and the remote engine starter comprises an engine start signal outputting section which outputs a signal related to engine starting, for example, an IG key insertion signal, an IG ON signal, etc., and a code outputting section which, in response to the interrogating signal, outputs the remote engine starter code preregistered in the remote engine starter.

The engine start signal outputting section of the remote engine starter outputs the signal related to engine starting when a remote commander code transmitted from a remote commander matches a remote commander verifying code preregistered in the remote engine starter.

In one preferred mode, the immobilizer further comprises an activation signal outputting section which outputs an activation signal to a key cylinder when a signal related to engine starting is received, and an engine start permitting section which receives a key code output from a key in response to the activation signal, and which gives engine start permission when the key code matches a preregistered code, and wherein the immobilizer includes an interrogating signal outputting section which outputs an interrogating signal to the remote engine starter when an IG key insertion signal is not received but the signal related to engine starting, other than the IG key insertion signal, is received.

In another preferred mode, the immobilizer further comprises an activation signal outputting section which outputs an activation signal to a key cylinder when a signal related to engine starting is received, and an engine start permitting section which receives a key code output from a key in response to the activation signal, and which gives engine start permission when the key code matches a preregistered code, and wherein the immobilizer includes an interrogating signal outputting section which outputs an interrogating signal to the remote engine starter when the key code is not received in response to the activation signal.

According to the present invention, there is also provided a remote control engine starting device for a vehicle having an immobilizer and a remote engine starter and equipped with a remote engine starting function for staring an engine when an engine start command is given from a remote location, wherein the immobilizer comprises an activation signal outputting section which outputs an activation signal to a key cylinder when a signal related to engine starting is received, and an engine start permitting section which receives a key code output from a key in response to the activation signal, and which gives engine start permission when the key code matches a preregistered code, wherein the immobilizer further comprises an interrogating signal outputting section which outputs an interrogating signal, different from the activation signal, when the signal related to engine starting is received, and an engine start permitting section which gives engine start permission when a remote engine starter code that the remote engine starter outputs in response to the interrogating signal matches a remote engine starter verifying code preregistered in the immobilizer, and the remote engine starter comprises an engine start signal outputting section which outputs a signal related to engine starting when the engine start command is given from a remote location, and a code outputting section which, in response to the interrogating signal, outputs the remote engine starter code preregistered in the remote engine starter.

In one preferred mode, the immobilizer includes an interrogating signal outputting section which outputs an interrogating signal to the remote engine starter when an IG key insertion signal is not received but a signal related to engine starting, other than the IG key insertion signal, is received.

In another preferred mode, the immobilizer includes an interrogating signal outputting section which outputs the activation signal and interrogating signal when the signal related to engine starting is received, and which outputs an interrogating signal to the remote engine starter when any key code is not received in response to the activation signal.

In another preferred mode, the immobilizer includes a match/mismatch judging section which outputs the activation signal and interrogating signal when the signal related to engine starting is received, and which, when the key code is received, judges whether the key code matches the preregistered code but, when the "remote engine starter code" is received, then judges whether the "remote engine starter code" matches the preregistered "remote engine starter verifying code".

The engine start permitting section for giving the engine start permission does not give the engine start permission when the "remote engine starter code" has failed to match the "remote engine starter verifying code" a predetermined number of times.

As described above, according to the present invention, since provisions are made, in remote engine starting, to permit the engine to be started only when the code preregistered in the remote engine starter matches the code preregistered in the immobilizer, the engine cannot be started unless the remote engine starter is a legitimate one, and this serves to enhance the security.

Furthermore, when sending the engine start command from the remote commander, since provisions are made to permit the remote engine starter to be started only when the code preregistered in the remote commander matches the code preregistered in the remote engine starter, the engine cannot be started unless the remote commander that issued the engine start command is a legitimate one. This serves to further enhance the security.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Figure 1:
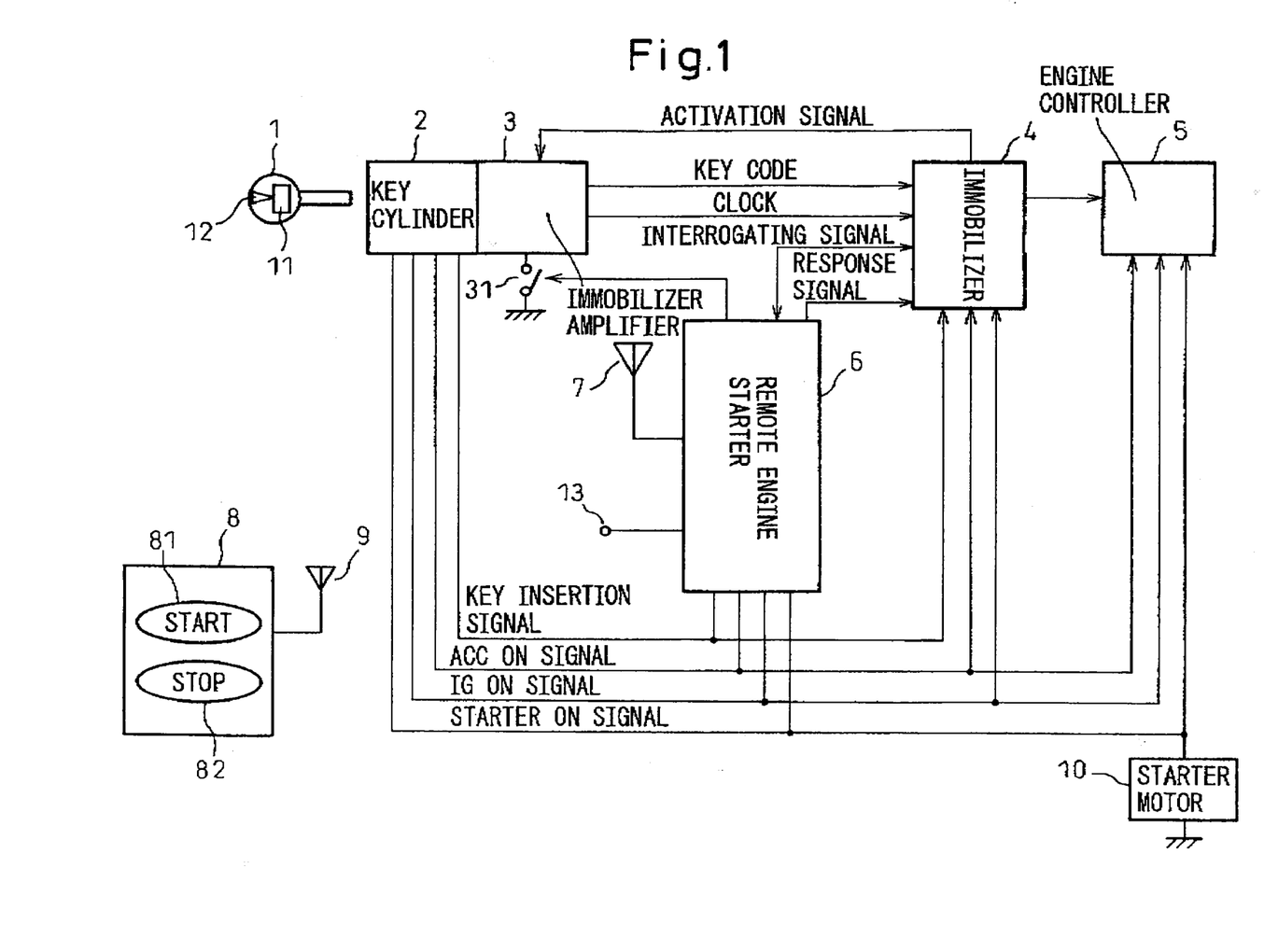
FIG. 1 is a diagram schematically showing the configuration of a remote control engine starting device for a vehicle equipped with an immobilizer function according to the present invention.

FIG. 1 is a diagram schematically showing the configuration of a remote control engine starting device for a vehicle equipped with an immobilizer function according to the present invention. Reference numeral 1 is an ignition (IG) key having a built-in antenna 12 and a built-in transponder 11 in which a unique code identifying the legitimate key is stored. Reference numeral 2 is a key cylinder, and various switches, such as an accessory switch (ACC) for turning power on and off to accessories (ACC), an ignition (IG) switch for turning power on and off to spark plugs, etc., and a starter switch for turning power on and off to the starter motor, are built into the key cylinder 2. When the IG key 1 is inserted in the key cylinder 2, a key insertion signal is output, and when the IG key 1 is turned therein, an ACC ON signal, an IG ON signal, a starter ON signal, etc. are output to an immobilizer 4, an engine controller 5, and the starter motor 10. Reference numeral 3 is an immobilizer amplifier which amplifies signals output from the IG key 1 and the immobilizer 4, and which is provided with a switch 31 for turning off the operation of the immobilizer amplifier 3.

Reference numeral 5 is the engine controller to which a permit signal is output from the immobilizer 4 when a prescribed condition is satisfied, thus permitting the engine to be started. Reference numeral 6 is a remote engine starter; when a start switch 81 on a remote commander 8 is pressed, a remote engine start signal is transmitted from an antenna 9 and received by an antenna 7 of the remote engine starter 6. The remote engine starter 6, upon receiving this signal, outputs an ignition ON signal (IG ON signal), etc. to the immobilizer 4 and the engine controller 5. In addition to the IG ON signal, the remote engine starter 6 outputs an ACC ON signal, starter ON signal, etc. A stop switch 82 is a switch for stopping the engine.

Figure 2:
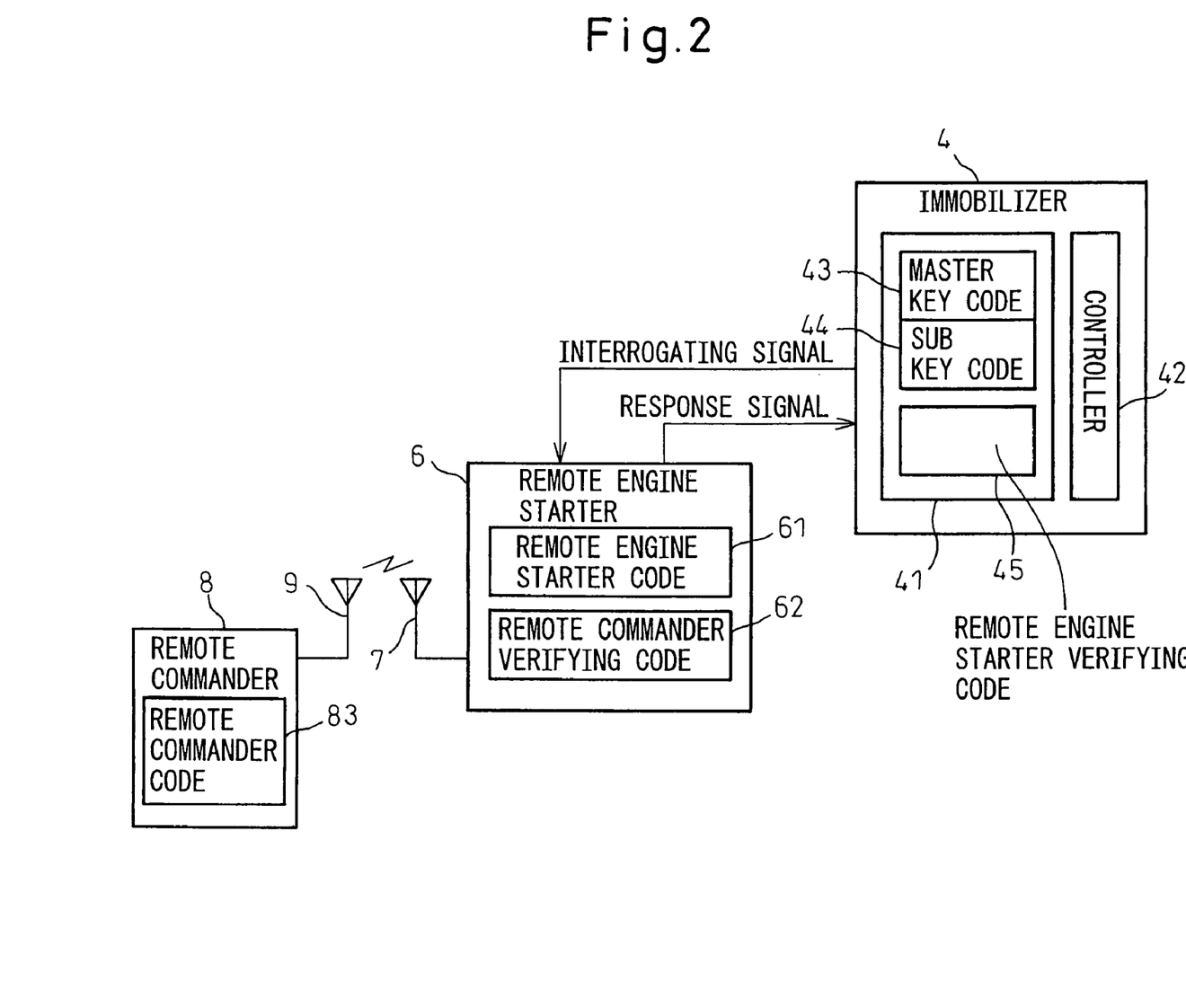
FIG. 2 is a diagram showing the configuration of an immobilizer, a remote engine starter, and a remote commander, focusing on the codes preregistered in their respective storing means.

FIG. 2 is a diagram showing the configuration of the immobilizer 4, the remote engine starter 6, and the remote commander 8, focusing on the codes preregistered in their respective storing means. The immobilizer 4 includes a storing section 41 and a control section 42, and a "master key code" 43 and a "sub key code 44, unique key codes for identifying the legitimate IG key, are preregistered in the storing section 41. Further, a "remote engine starter verifying code" 45 is preregistered which is a code for verifying whether the remote engine starter according to the present invention is a legitimate one or not.

In the storing means of the remote engine starter 6, there are preregistered a "remote engine starter code" 61, which is a code uniquely identifying the remote engine starter, and a "remote commander verifying code" 62, which is a code for verifying whether the remote commander is a legitimate one or not. On the other hand, a "remote commander code" 83, which is a code uniquely identifying the remote commander, is preregistered in the storing means of the remote commander 8.

The immobilizer 4 comprises an "interrogating signal outputting section" which outputs an interrogating signal when a signal related to engine starting is received, a "match/mismatch judging section" which judges whether the remote engine starter code matches the remote engine starter verifying code and whether the key code output from the key matches the preregistered key code, an "engine start permitting section" which permits the engine to be started when the remote engine starter code matches the remote engine starter verifying code or when the key code output from the key matches the preregistered key code, and an "activation signal outputting section" which outputs an activation signal to the cylinder when a signal related to engine starting is received.

The remote engine starter comprises an "engine start signal outputting section" which outputs a signal related to engine starting, and a "code outputting section" which, in response to the interrogating signal, outputs the remote engine starter code preregistered in the remote engine starter.

Figure 3A:
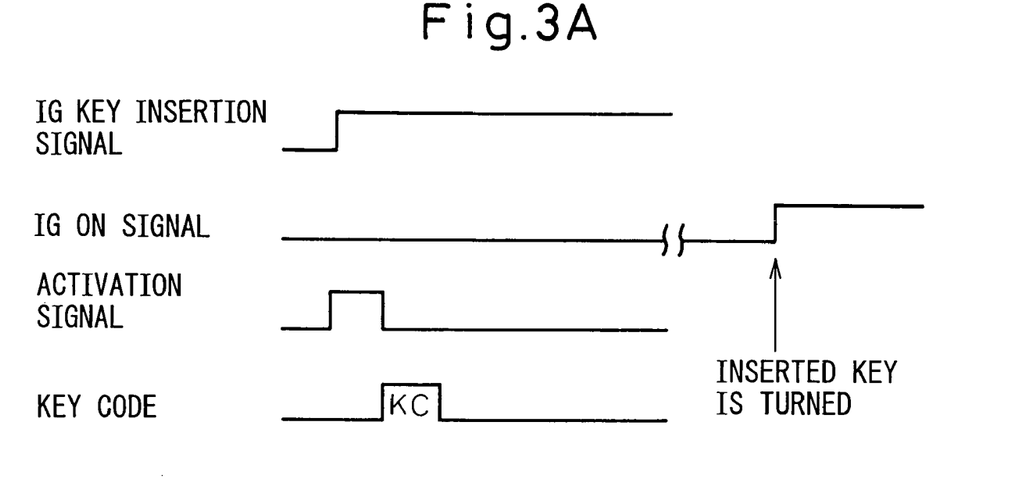
FIGS. 3A and 3B are waveform diagrams for explaining an anti-theft operation when starting the engine by inserting an ignition key 1 in a key cylinder 2.
Figure 3B:
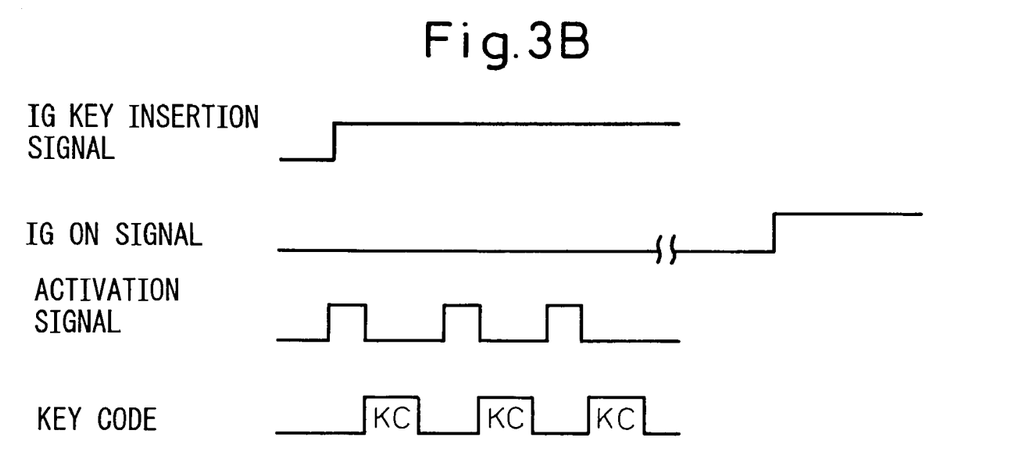

FIGS. 3A and 3B are waveform diagrams for explaining an anti-theft operation when starting the engine by inserting the IG key 1 in the key cylinder 2. Referring to FIG. 3A, when the IG key 1 is inserted in the key cylinder 2, the IG key insertion signal is set ON and is output to the immobilizer 4. Upon receiving this signal, the immobilizer 4 outputs a pulse-like activation signal to the immobilizer amplifier 3. The immobilizer amplifier 3 is equipped with an antenna (not shown) for receiving the unique key code stored in the transponder 11 built into the IG key 1, and transmits the received key code (KC) to the immobilizer 4 when the activation signal is received. If the received key code (KC) matches either the master key code or the sub key code, the immobilizer 4 gives engine start permission to the engine controller 5, while stopping the output of the activation signal until the IG key is removed from the key cylinder.

The IG ON signal is output with a delay relative to the key insertion signal, because the former is output when the inserted key is turned.

On the other hand, even when the legitimate IG key is inserted, the unique key code may not match the code stored in the immobilizer due to the effect of noise. In that case, the activation signal is re-transmitted. FIG. 3B shows the case where the activation signal is transmitted three times and the key code KC transmitted for the third time is judged to match the stored code.

When the key code is transmitted from the immobilizer amplifier 3 to the immobilizer 4, the immobilizer 4 judges whether the key code matches the master key code or the sub key code shown in FIG. 2 and, if they match, outputs the permit signal to the engine controller 5, thus permitting the engine to be started. On the other hand, if an illegitimate IG key is inserted, the key code that matches the code preregistered in the immobilizer is not output even when the activation signal is transmitted from the immobilizer 4 to the immobilizer amplifier 3. If the key code is not output even when the activation signal has been output a predetermined number of times, it is determined that the inserted key is not a legitimate IG key, and the output of the activation signal is stopped. If a key code different from the one preregistered in the immobilizer 4 is output, the permit signal will not be output from the immobilizer 4 to the engine controller 5.

Figure 4A:
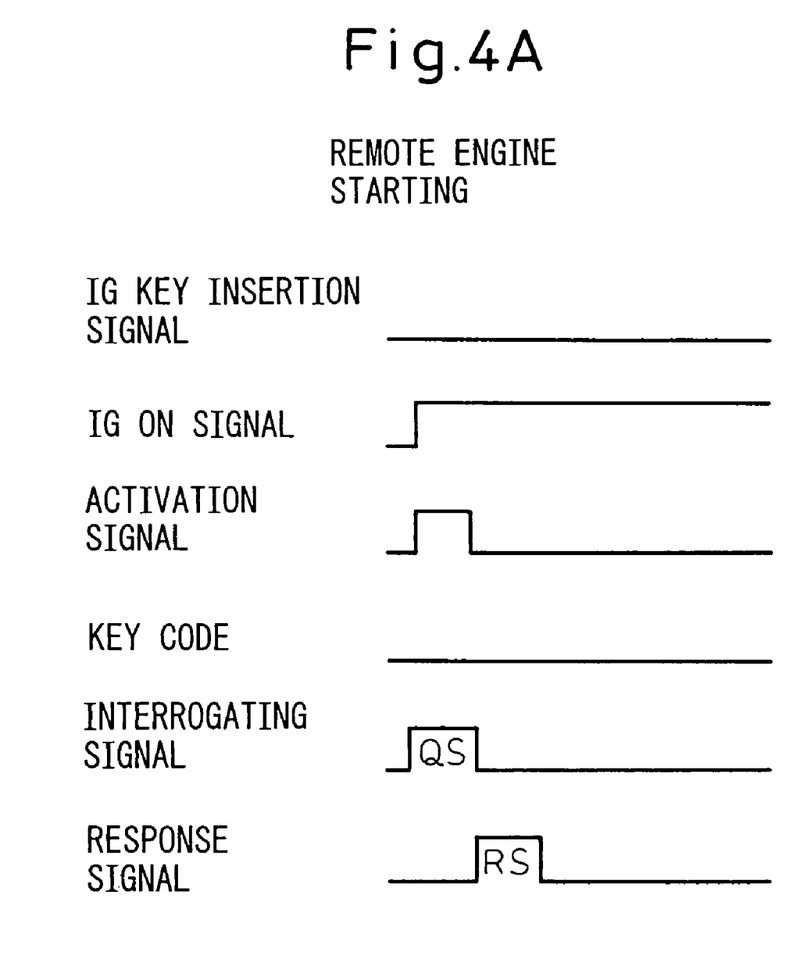
FIGS. 4A and 4B are diagrams showing a comparison between signal waveforms at the time of remote engine starting (FIG. 4A) and signal waveforms at the time of engine starting by insertion of the key (FIG. 4B)
Figure 4B:
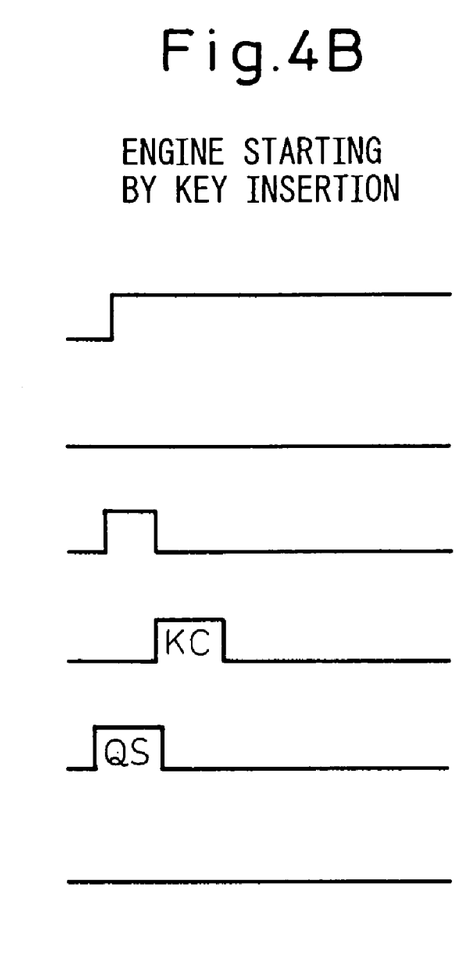

Next, one example of remote engine starting according to the present invention will be described with reference to the waveforms shown in FIGS. 4A and 4B. FIGS. 4A and 4B show a comparison between the signal waveforms at the time of remote engine starting (FIG. 4A) and the signal waveforms at the time of engine starting by insertion of the key (FIG. 4B).

When the start switch 81 on the remote commander 8 is pressed, the remote engine start signal is transmitted from the transmitting antenna 9 and received by the receiving antenna 7 of the remote engine starter 6. The signal transmitted from the transmitting antenna 9 contains the "remote commander code" 83 which is the unique code of the remote commander. The remote engine starter 6 receives this signal via the receiving antenna 7 and, if the "remote commander code" 83 matches the "remote commander verifying code" 62 preregistered in the remote engine starter 6, the IG ON signal, etc. as the signals related to engine starting are output from the engine start signal outputting section of the remote engine starter 6 and transmitted to the immobilizer 4 and the engine controller 5.

When the IG ON signal output from the remote engine starter 6 is received by the immobilizer 4, the interrogating signal outputting section of the immobilizer 4 outputs the interrogating signal QS to the remote engine starter 6. At the same time, the activation signal is transmitted to the immobilizer amplifier 3, but no key code is returned because the key is not inserted. The interrogating signal QS is output when the "remote starter verifying code", is preregistered in the immobilizer 4. When the interrogating signal QS is received by the remote engine starter 6, the code outputting section of the remote engine starter 6 outputs a response signal RS which contains the "remote engine starter code" preregistered in the remote engine starter 6. The immobilizer 4, which received this signal, judges whether the "remote engine starter verifying code" preregistered therein matches the "remote engine starter code" contained in the response signal and, if they match, the engine start permitting section of the immobilizer outputs the permit signal to the engine controller 5, thus permitting the engine to be started. If the remote engine starter 6 is not a legitimate one, the code preregistered therein does not match the "remote engine starter verifying code" preregistered in the immobilizer 4, so that the permit signal will not be output to the engine controller.

Here, the "remote commander verifying code" and the "remote engine starter code" may be different codes or may be the same code.

When starting the engine by inserting the IG key, the IG key insertion signal is output upon insertion of the IG key, and in response, the activation signal outputting section of the immobilizer 4 outputs the activation signal, whereupon a key code is output from the immobilizer amplifier 3. At the same time, the interrogating signal QS is also output, but no response signal is returned because the remote engine starter is not operating. In the case of engine starting by insertion of the key, the IG ON signal, etc. are not output when the key is simply inserted, but are output when the key is turned. However, provisions may be made to output the key insertion signal, the IG ON signal, etc. when the key is turned.

Embodiment 1

Figure 5:
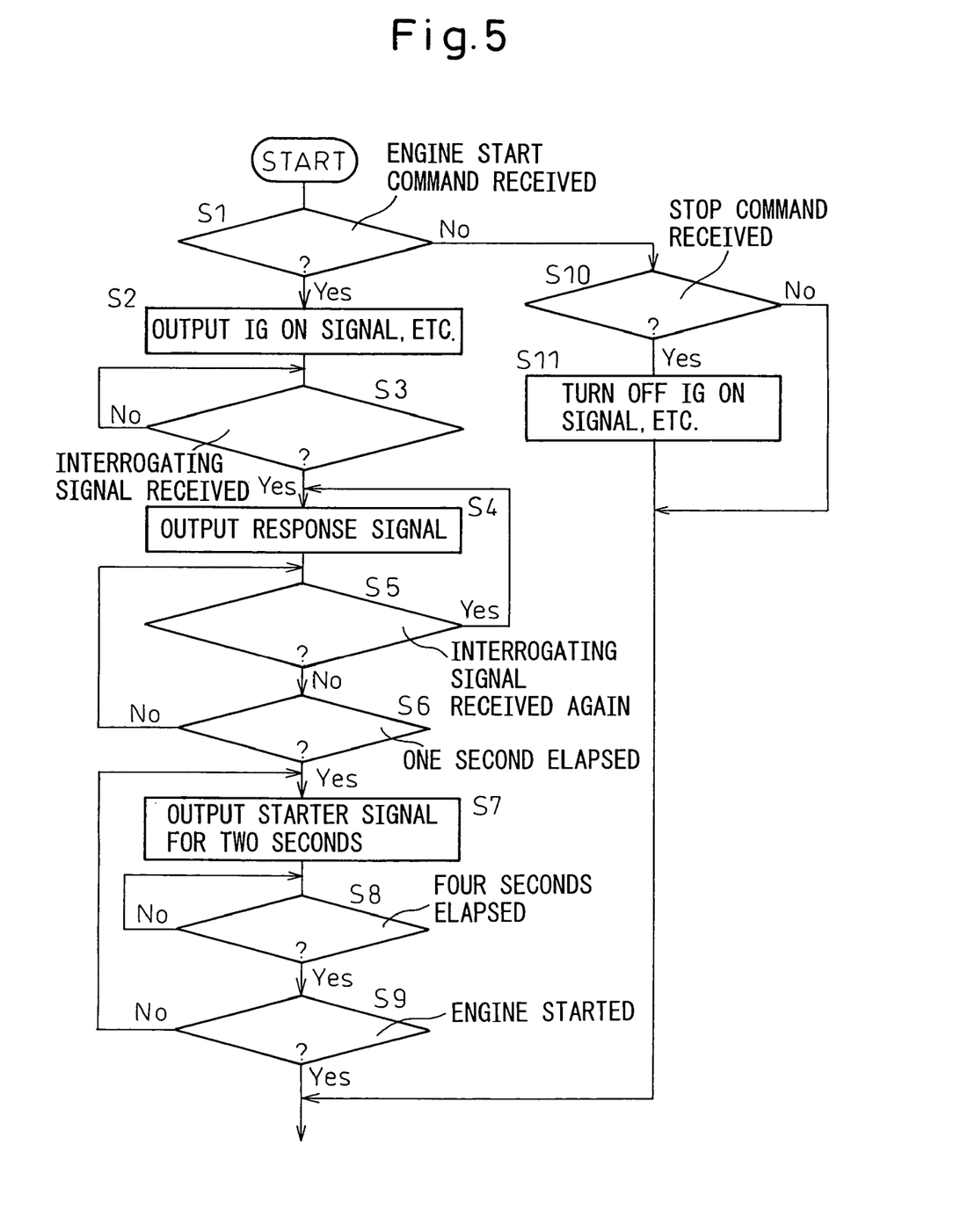
FIG. 5 is a flowchart illustrating an embodiment according to the present invention.

FIG. 5 is a flowchart illustrating an embodiment of the remote control engine starting device according to the present invention. Control of the operation, etc. shown in the flowchart is performed in the remote engine starter 6.

When starting the engine by inserting the IG key, the IG key insertion signal is output upon insertion of the IG key and, in response, the activation signal outputting section of the immobilizer 4 outputs the activation signal, but in the case of remote engine starting, the signal is not output. In the case of engine starting by insertion of the key, the IG ON signal, etc. are not output when the key is simply inserted, but are output when the key is turned. However, provisions may be made to output the key insertion signal, the IG ON signal, etc. when the key is turned.

In FIG. 5, when the routine is initiated, it is determined whether an engine start command has been issued or not (S1). When the start switch 81 on the remote commander 8 is pressed, the remote engine start signal is transmitted from the transmitting antenna 9 and received by the receiving antenna 7 of the remote engine starter 6. The remote engine start signal transmitted from the transmitting antenna 9 contains the "remote commander code" which is the unique code of the remote commander. The remote engine starter 6 receives this signal via the receiving antenna 7 and, if this unique code of the remote commander matches the "remote commander verifying code" preregistered in the remote engine starter 6, then it is determined that an engine start command has been issued (Yes).

When it is determined that an engine start command has been issued, the engine start signal outputting section of the remote engine starter 6 outputs the IG ON signal, the ACC ON signal, etc. to the immobilizer 4 and the engine controller 5 (S2). When the IG ON signal is received, the immobilizer 4 checks whether the "remote engine starter verifying code" is registered or not and, if it is registered, the interrogating signal outputting section of the immobilizer 4 outputs the interrogating signal to the remote engine starter 6. Next, it is checked whether or not the interrogating signal is received by the remote engine starter 6 (S3). If the interrogating signal is not received (No), it is checked once again whether the interrogating signal is received or not.

If the interrogating signal is received (Yes in S3), the remote engine starter 6 outputs a response signal to the immobilizer 4 (S4). Next, it is determined whether the interrogating signal is once again received (S5). If the answer is Yes, this means that the response signal was not output in the first place or, if it was output, the "remote engine starter code" of the remote engine starter contained in the response signal did not match the "remote engine starter verifying code" stored in the immobilizer 4; therefore, the process returns to S4, and the response signal is output once again.

If the interrogating signal is no longer received (No), then it is determined whether a predetermined time, for example, one second, has elapsed from the output of the response signal (S6). If the answer is No, the process returns to S5 to determine whether the interrogating signal is once again received. If the interrogating signal is no longer received after one second has elapsed in S6 (Yes), this means that the response signal was output and the codes were found to match each other, the remote engine starter 6 outputs the starter ON signal to the starter motor 10, the immobilizer 4, and the engine controller 5 for a predetermined length of time, for example, two seconds (S7). Next, it is determined whether a predetermined time, for example, four seconds, has elapsed from the output of the starter signal (S8). If four seconds have elapsed (Yes), it is determined whether the engine has started (S9). If the engine has started (Yes), the engine start process is terminated. Here, the determination is made by checking the output of an alternator L terminal 13 because the output of this terminal being input to the remote engine starter 6 should go to "H" when the engine has started.

If, in S1, it is determined that there is no engine start command, then it is determined whether an engine stop command has been received (S10). If the engine stop command has been received (Yes), the remote engine starter 6 stops outputting the IG ON signal, the ACC ON signal, etc. (S11). If there is no engine stop command in S10 (No), the process is immediately terminated.

Embodiment 2

Figure 6:
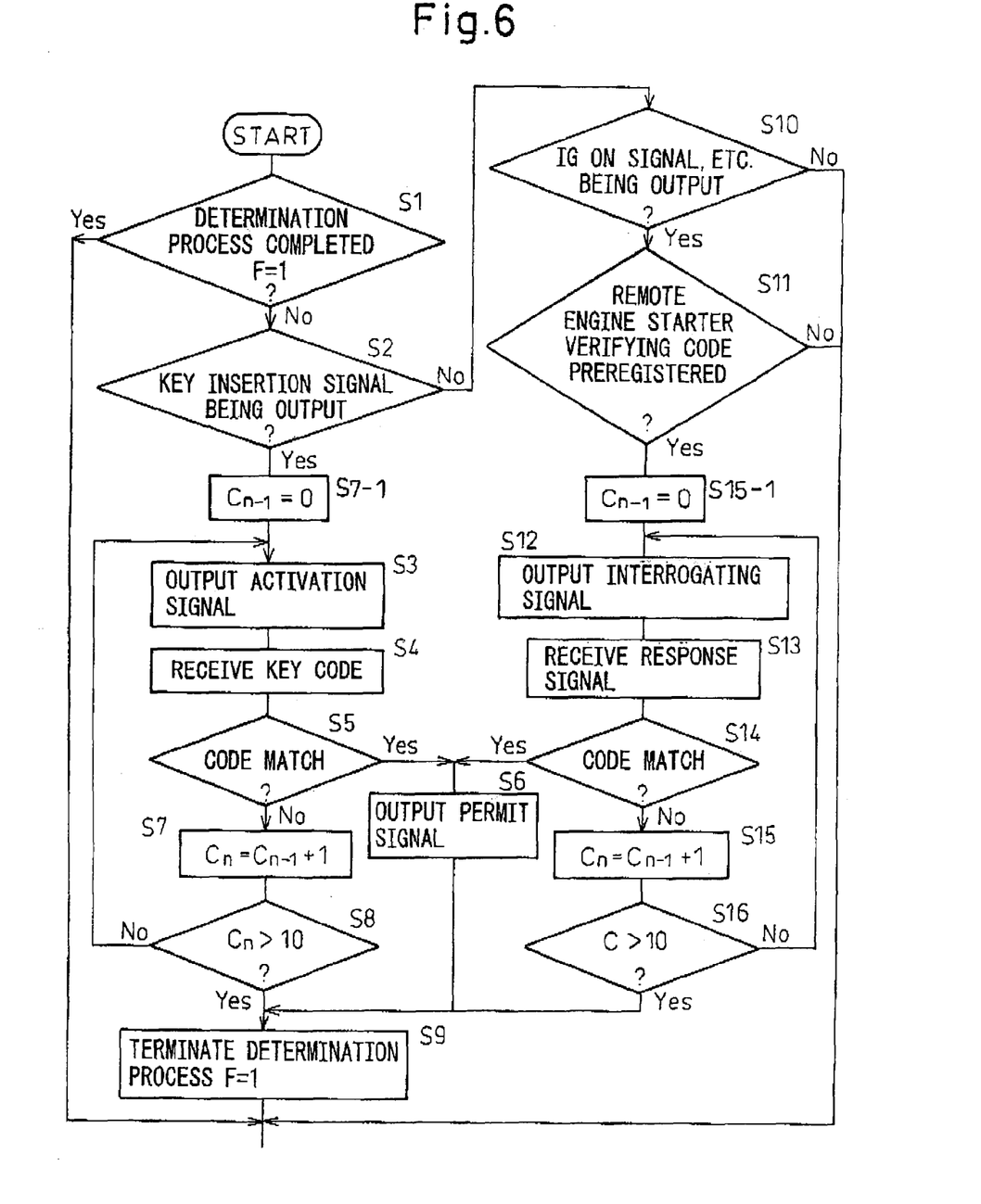
FIG. 6 is a flowchart illustrating an embodiment according to the present invention.
Figure 7A:
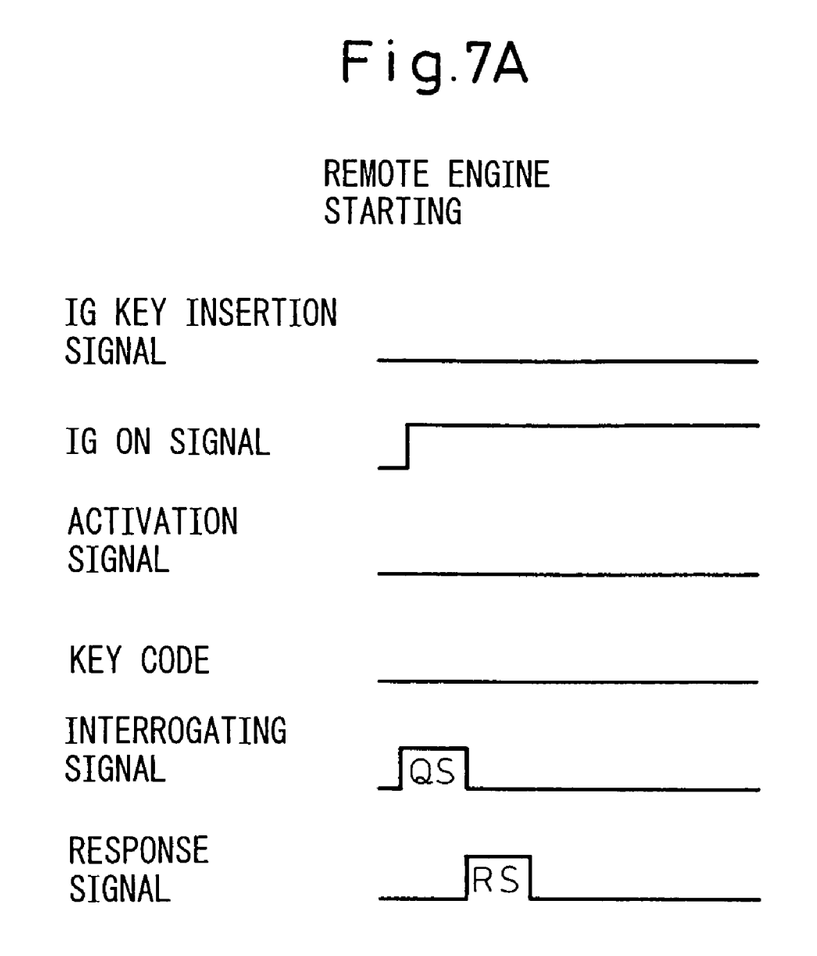
FIGS. 7A and 7B are diagrams showing signal waveforms at the time of remote engine starting (FIG. 7A) and signal waveforms at the time of insertion of the key (FIG. 7B) in the flowchart of FIG. 6.
Figure 7B:
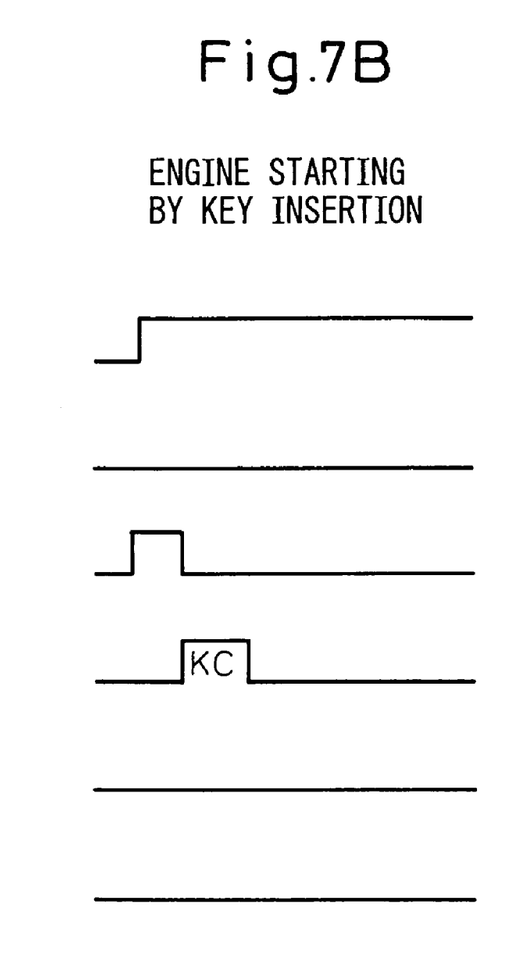

FIG. 6 is a flowchart illustrating an embodiment of the immobilizer 4 according to the present invention, and FIGS. 7A and 7B show signal waveforms at the time of remote engine starting (FIG. 7A) and signal waveforms at the time of insertion of the key (FIG. 7B) in the flowchart.

According to the flowchart shown in FIG. 6, when the IG ON signal is received without first receiving the IG key insertion signal, the immobilizer 4 outputs the interrogating signal to the remote engine starter 6.

In FIG. 6, when the routine is initiated, it is determined whether the engine start permit/deny determination process is completed or not (S1). If the determination process is completed and the determination completion flag is ON (F=1) (Yes), the routine is immediately terminated. If the determination process is not completed and the determination completion flag is not ON (not F=1) (No), then it is determined whether the IG key is inserted or not (S2). If the key is inserted, the key insertion signal is output to the immobilizer 4 and the engine controller 5 as shown in FIG. 7B (Yes), and the activation signal outputting section of the immobilizer 4 outputs the activation signal to the immobilizer amplifier 3 (S3). Upon receiving the activation signal, the immobilizer amplifier 3 outputs the unique key code KC of the IG key 1, and the immobilizer 4 receives this key code (S4).

The immobilizer 4 judges whether the unique key code KC matches the stored key code 43 or 44 (S5). If they match (Yes), the engine start permitting section of the immobilizer 4 outputs the permit signal to the engine controller 5 (S6), and the determination process is terminated (S9). On the other hand, if the key codes do not match in S5 (No), +1 is added to the number of mismatches, (Cn−1), that occurred up to the previous cycle of the routine (S7), and it is determined whether the accumulated number of mismatches, Cn, exceeds a predetermined value, for example, 10 (S8). Before the determination, a counter is initialized (S7-1) between step S2 and S3. If it exceeds 10 (Yes), the determination process is terminated (S9), and the engine will not be started. On the other hand, if the answer in S8 is No, the process returns to S3 where the activation signal is output once again. In this way, the determination as to whether the codes match or not is performed repeatedly and, if they still do not match after trying more than the predetermined number of times, the engine will not be started.

If the key insertion signal is not output in S2 (No), then it is determined whether the IG ON signal, etc. are output (S10). If they are output (Yes), the remote engine starter 6 operates as shown in FIG. 7A; that is, as the IG ON signal is output to the immobilizer 4, it is determined whether or not the remote engine starter verifying code for the remote engine starter 6 is preregistered in the immobilizer 4 (S11). If it is preregistered (Yes), the interrogating signal outputting section of the immobilizer 4 outputs the interrogating signal QS to the remote engine starter 6 (S12), whereupon the remote engine starter 6 outputs a response signal RS which is received by the immobilizer 4 (S13). The immobilizer 4 judges whether the "remote engine starter code" preregistered in the remote engine starter and contained in the received response signal matches the "remote engine starter verifying code" stored in the immobilizer 4 (S14) and, if they match (Yes), the immobilizer 4 outputs the permit signal to the engine controller 5 (S6), and the determination process is terminated (S9). On the other hand, if the codes do not match in S14 (No), +1 is added to the number of mismatches, (Cn−1), that occurred up to the previous cycle of the routine (S15), and it is determined whether the accumulated number of mismatches, Cn, exceeds a predetermined number, for example, 10 (S16). Before the determination, a counter is initialized (S15-1) between step S11 and S12. If it exceeds 10 (Yes), the determination process is terminated (S9), and the engine will not be started. On the other hand, if the answer in S16 is No, the process returns to S12 where the interrogating signal is output once again. In this case also, the determination as to whether the codes match or not is performed repeatedly and, if they still do not match after trying more than the predetermined number of times, the engine will not be started.

Embodiment 3

Figure 8:
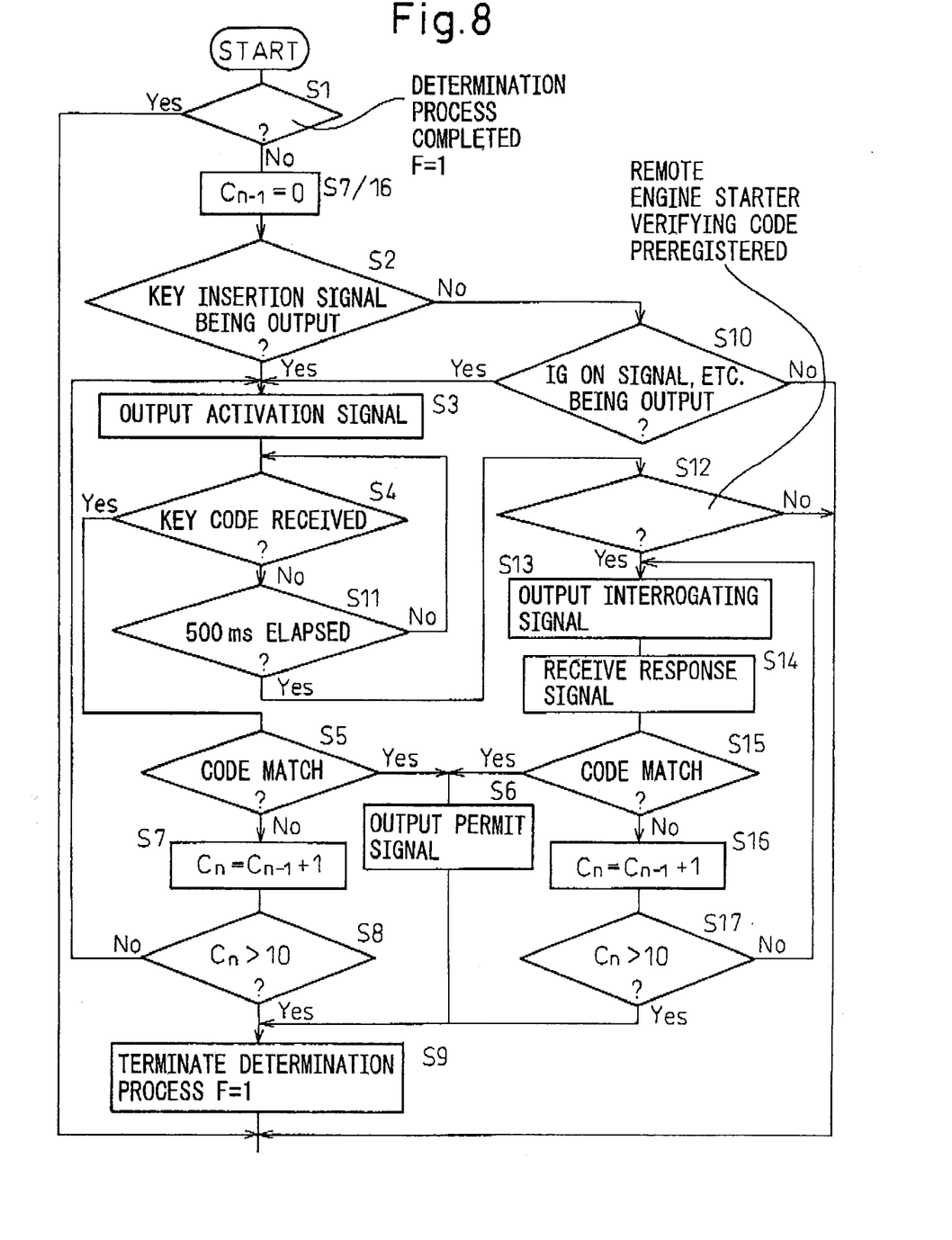
FIG. 8 is a flowchart illustrating an embodiment according to the present invention.
Figure 9A:
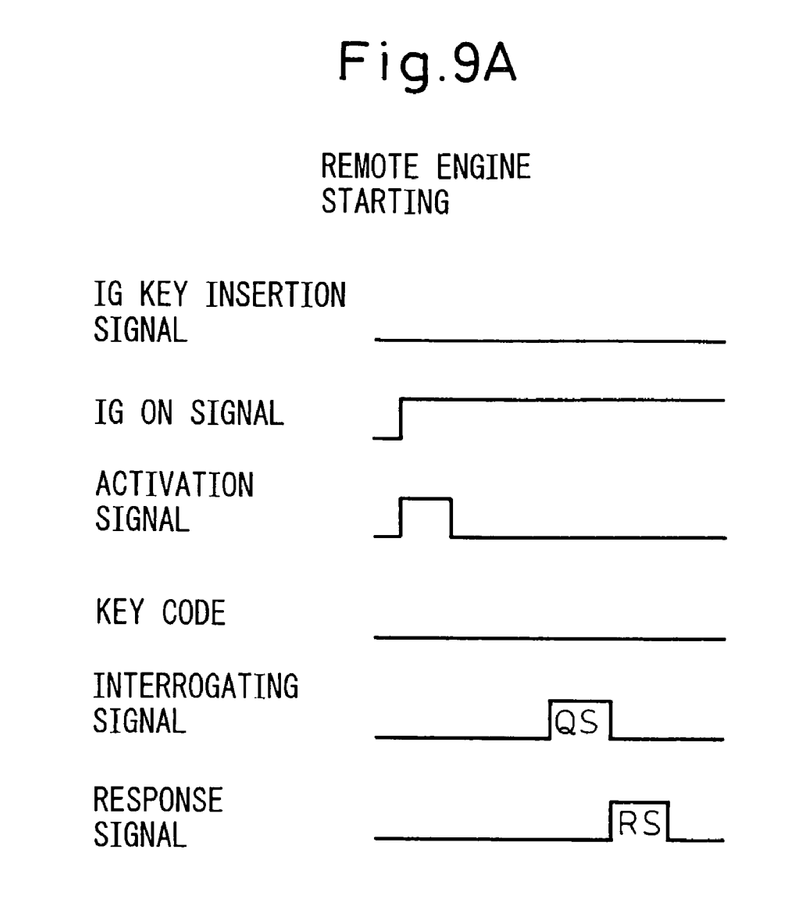
FIGS. 9A and 9B are diagrams showing signal waveforms at the time of remote engine starting (FIG. 9A) and signal waveforms at the time of insertion of the key (FIG. 9B) in the flowchart of FIG. 8.
Figure 9B:
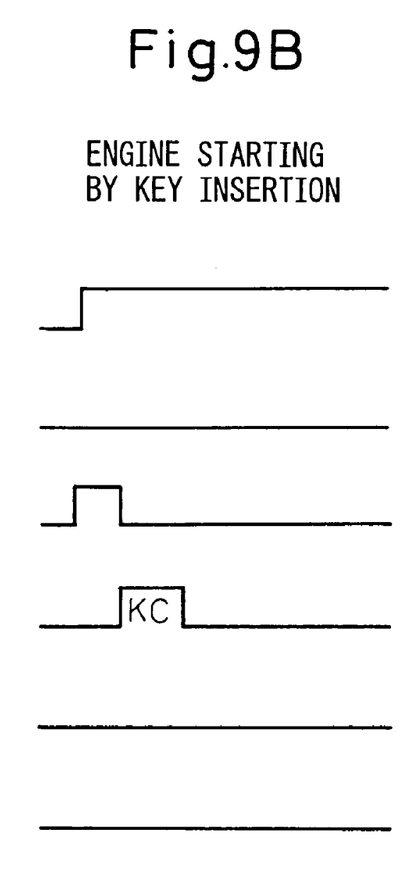

FIG. 8 is a flowchart illustrating another embodiment of the immobilizer 4 according to the present invention, and FIGS. 9A and 9B show signal waveforms at the time of remote engine starting (FIG. 9A) and signal waveforms at the time of insertion of the key (FIG. 9B) in the flowchart.

According to the flowchart shown in FIG. 8, when the IG ON signal is received but the key code is not received, the immobilizer 4 outputs the interrogating signal to the remote engine starter 6. In this embodiment, the remote engine starter 6 may be configured to output the IG key insertion signal, not the IG ON signal, as the signal related to engine starting, or to output both the IG ON signal and the IG key insertion signal.

In FIG. 8, when the routine is initiated, it is determined whether the engine start permit/deny determination process is completed or not (S1). If the determination process is completed and the determination completion flag is ON (F=1) (Yes), the routine is immediately terminated. If the determination process is not completed and the determination completion flag is not ON (not F=1) (No), then it is determined whether the key is inserted or not (S2). If the key is inserted, the key insertion signal is output to the immobilizer 4 and the engine controller 5 as shown in FIG. 9B (Yes), and the immobilizer 4 outputs the activation signal to the immobilizer amplifier 3 (S3). Upon receiving the activation signal, the immobilizer amplifier 3 outputs the unique key code KC of the IG key 1 (S4).

Next, it is determined whether this code is received by the immobilizer 4 (S4). If the key code KC is received (Yes), the immobilizer 4 judges whether the received key code KC matches the stored key code 43 or 44 (see FIG. 2) (S5). If they match (Yes), the immobilizer 4 outputs the permit signal to the engine controller 5 (S6), and the determination process is terminated (S9). On the other hand, if the codes do not match in S5 (No), +1 is added to the number of mismatches, (Cn−1), that occurred up to the previous cycle of the routine (S7), and it is determined whether the accumulated number of mismatches, Cn, exceeds a predetermined value, for example, 10 (S8). Before the determination, a counter is initialized (S7/16) between step S1 and S2. If it exceeds 10 (Yes), the determination process is terminated (S9), and the engine will not be started. On the other hand, if the answer in S8 is No, the process returns to S3 where the activation signal is output once again. In this way, the determination as to whether the codes match or not is performed repeatedly and, if they still do not match after trying more than the predetermined number of times, the engine will not be started.

If the key insertion signal is not output in S2 (No), then it is determined whether the IG ON signal is output (S10). If the IG ON signal is output as shown in FIG. 9A (Yes), the immobilizer 4 outputs the activation signal to the immobilizer amplifier 3 (S3). Next, it is determined whether the key code is received by the immobilizer 4 (S4). If the key is inserted, the immobilizer amplifier 3 should output the unique key code KC of the IG key 1 upon receiving the activation signal; in the present case, however, the key is not inserted, so that the key code is not received (No). The process therefore proceeds to S11 to determine whether a predetermined time, for example, 500 ms, has elapsed from the output of the activation signal (S11). If the answer is No, the process returns to S4 to determine once again whether the key code is received or not. This is done to verify whether the key is inserted or not, even when it is determined in S2 that the key is not inserted.

If it is determined in S11 that 500 ms have elapsed (Yes), that is, if any key code has not been received for 500 ms, then it can be determined that the IG ON signal has been output, not because of the insertion of the key, but from the remote engine starter 6; therefore, it is determined whether or not the "remote engine starter verifying code" is preregistered in the immobilizer 4 (S12). If it is preregistered (Yes), the immobilizer 4 outputs the interrogating signal to the remote engine starter 6 (S13), whereupon the remote engine starter 6 outputs a response signal which is received by the immobilizer 4 (S14).

The immobilizer 4 judges whether the "remote engine starter code" 61 preregistered in the remote engine starter and contained in the received response signal matches the "remote engine starter verifying code" 45 preregistered in the immobilizer 4 (S15) and, if they match (Yes), the immobilizer 4 outputs the permit signal to the engine controller 5 (S6), and the determination process is terminated (S9). On the other hand, if the codes do not match in S15 (No), +1 is added to the number of mismatches, (Cn−1), that occurred up to the previous cycle of the routine (S16), and it is determined whether the accumulated number of mismatches, Cn, exceeds a predetermined number, for example, 10 (S17). Before the determination, a counter is initialized (S7/16) between steps S1 and S2. If it exceeds 10 (Yes), the determination process is terminated (S9), and the engine will not be started. If the answer in S17 is No, on the other hand, the process returns to S13 where the interrogating signal is output once again. In this case also, the determination as to whether the codes match or not is performed repeatedly and, if they still do not match after trying more than the predetermined number of times, the engine will not be started. If No in S10, the process is terminated immediately.

Embodiment 4

Figure 10:
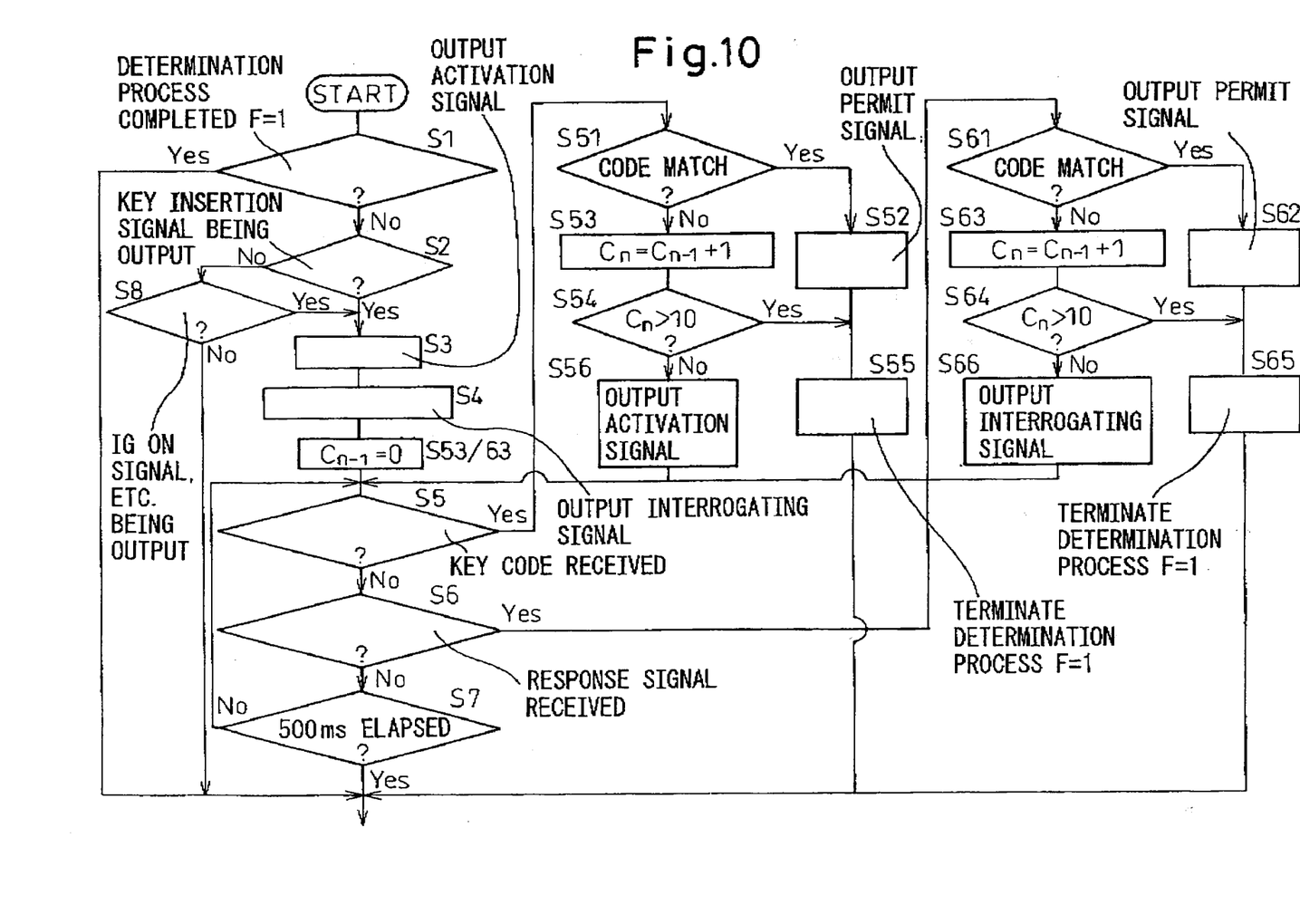
FIG. 10 is a flowchart illustrating an embodiment according to the present invention.
Figure 11A:
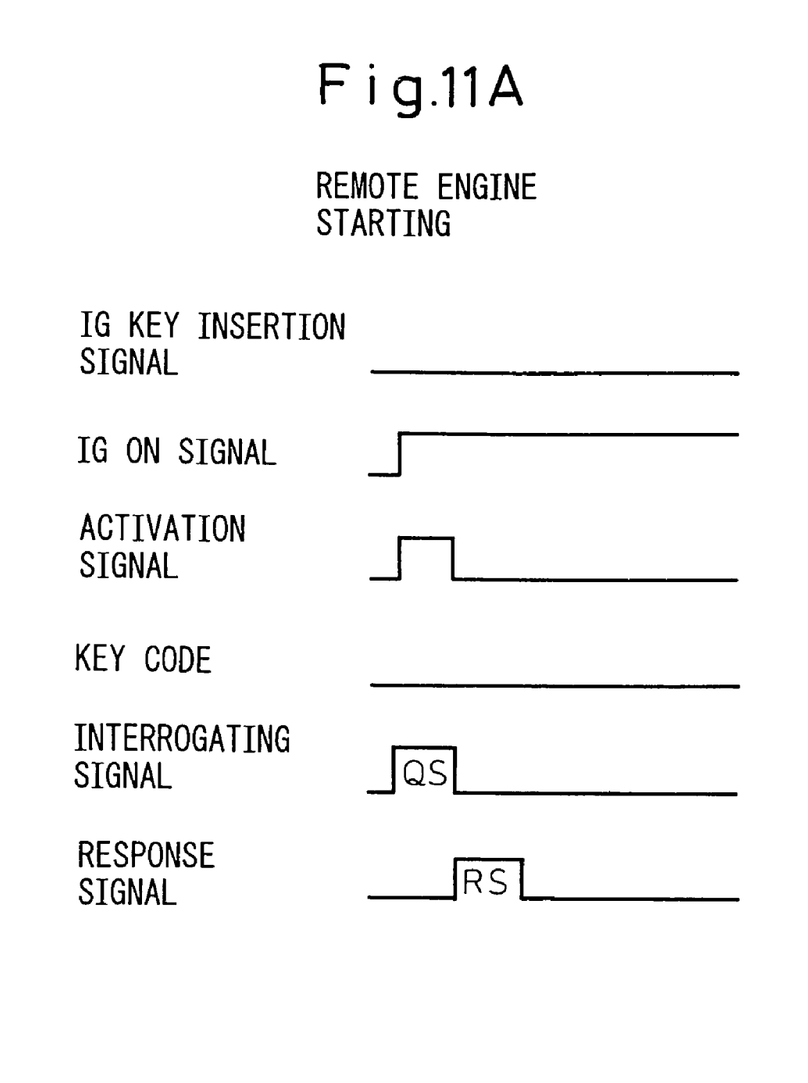
FIGS. 11A and 11B are diagrams showing signal waveforms at the time of remote engine starting (FIG. 11A) and signal waveforms at the time of insertion of the key (FIG. 11B) in the flowchart of FIG. 10.
Figure 11B:
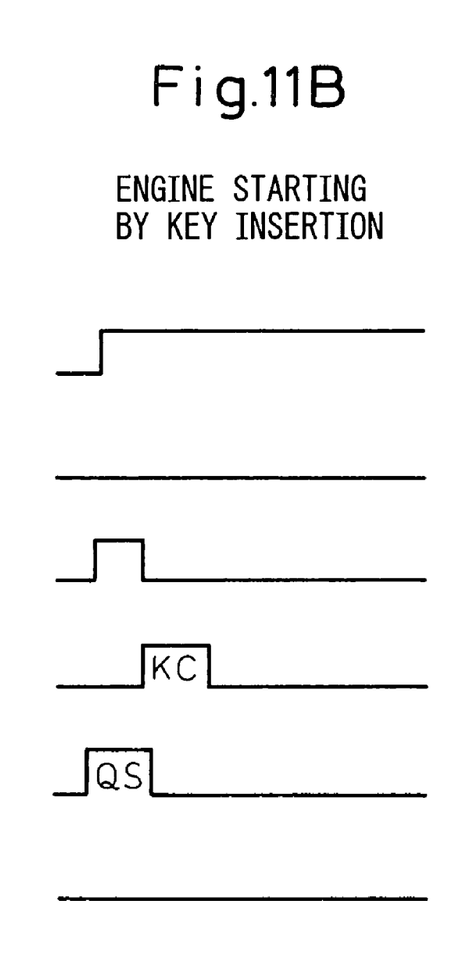

FIG. 10 is a flowchart illustrating still another embodiment of the immobilizer 4 according to the present invention, and FIGS. 11A and 11B show signal waveforms at the time of remote engine starting (FIG. 11A) and signal waveforms at the time of insertion of the key (FIG. 11B) in the flowchart.

According to the flowchart shown in FIG. 10, when either one of the signals, the key insertion signal or the IG ON signal, is received, the immobilizer 4 outputs both the activation signal and the interrogating signal. In this embodiment also, the remote engine starter 6 may be configured to output the IG key insertion signal, and not the IG ON signal, as the signal related to engine starting, or to output both the IG ON signal and the IG key insertion signal.

In FIG. 10, when the routine is initiated, it is determined whether the engine start permit/deny determination process is completed or not (S1). If the determination process is completed and the determination completion flag is ON (F=1) (Yes), the routine is immediately terminated. If the determination process is not completed and the determination completion flag is not ON (not F=1) (No), then it is determined whether the key is inserted or not (S2).

<Engine Starting by Key Insertion>

If the key is inserted, the key insertion signal is output to the immobilizer 4 and the engine controller 5, as shown in FIG. 11B (Yes). Then, the immobilizer 4 outputs the activation signal to the immobilizer amplifier 3 (S3). At the same time, the immobilizer 4 outputs the interrogating signal to the remote engine starter 6 (S4).

When the activation signal is output to the immobilizer amplifier 3 (S3), the immobilizer amplifier 3 responds by outputting the key code KC because the key is inserted. As the key is inserted, this is not the case of remote engine starting; therefore, even when the interrogating signal QS is output to the remote engine starter 6 (S4), no response signal is returned from the remote engine starter 6.

When the activation signal is received, the immobilizer amplifier 3 outputs the unique key code KC of the IG key 1. Next, it is determined whether the immobilizer 4 has received the key code (S5). If the key code is received (Yes), the match/mismatch judging section of the immobilizer 4 judges whether the unique key code KC matches the registered key code 43 or 44 (S51). If they match (Yes), the immobilizer 4 outputs the permit signal to the engine controller 5 (S52), and the process is terminated (S55).

On the other hand, if the codes do not match in S51 (No), +1 is added to the number of mismatches, (Cn−1), that occurred up to the previous cycle of the routine (S53), and it is determined whether the accumulated number of mismatches, Cn, exceeds a predetermined number, for example, 10 (S54). Before the determination, a counter is initialized (S53/63) between S4 and S5. If it exceeds 10 (Yes), the determination process is terminated (S55), and the engine will not be started. If the answer in S54 is No, on the other hand, the activation signal is output (S56). Then, the process proceeds to S5, and if the key code is received (Yes), the process proceeds to S51 as in the previous cycle. In this way, the determination as to whether the codes match or not is performed repeatedly and, if they still do not match after trying more than the predetermined number of times (Yes in S54), the determination process is terminated, and the engine will not be started.

<Remote Engine Starting>

If the key is not inserted (No in S2), then it is determined whether the IG ON signal, etc. are output as shown in FIG. 11A (S8). If the IG ON signal, etc. are not output (No), no determination is made and the process is immediately terminated. On the other hand, if the IG ON signal, etc. are output (Yes), that is, in the case of remote engine starting, the immobilizer 4 outputs the activation signal to the immobilizer amplifier 3 as in the case of the engine starting by key insertion (S3). At the same time, the immobilizer 4 outputs the interrogating signal to the remote engine starter 6 (S4).

In this case, however, since the key is not inserted, the key code is not output even when the activation signal is output to the immobilizer amplifier 3, and therefore, the immobilizer 4 does not receive any key code (No in S5). On the other hand, as the situation is remote engine starting, the remote engine starter 6 responds to the interrogating signal by outputting the response signal which is received by the immobilizer 4 (Yes in S6).

When the response signal is received, the match/mismatch judging section of the immobilizer 4 judges whether the "remote engine starter code" 61 preregistered in the remote engine starter 6 and contained in the response signal matches the "remote engine starter verifying code" 45 stored in the immobilizer 4 (S61). If they match (Yes), the immobilizer 4 outputs the permit signal to the engine controller 5 (S62), and the determination process is terminated (S65). On the other hand, if the preregistered code does not match the remote engine starter verifying code in S61 (No), +1 is added to the number of mismatches, (Cn−1), that occurred up to the previous cycle of the routine (S63), and it is determined whether the accumulated number of mismatches, Cn, exceeds a predetermined number, for example, 10 (S64). If it exceeds 10 (Yes), the determination process is terminated, and the engine will not be started (S65). If the answer in S64 is No, on the other hand, the interrogating signal is output (S66).

If the response signal is received as a result (Yes in S6), the process proceeds to S61 as in the previous cycle. In this way, the determination as to whether the codes match or not is performed repeatedly and, if they still do not match after trying more than the predetermined number of times (Yes in S64), the determination process is terminated, and the engine will not be started.

<Neither Key Code Nor Response Signal is Received>

If neither the key code nor the response signal is received (No in S5 and S6), it is determined whether a predetermined time, for example, 500 ms, has elapsed from the output of the activation signal or the interrogating signal (S7). If the answer is Yes, the process is immediately terminated. If the answer is No, it is once again determined whether the key code is received or whether the response signal is received, and it is determined whether a predetermined time, for example, 500 ms, has elapsed from the output of the activation signal or the interrogating signal (S7). If the key code is received before the time expires (Yes in S5), the process proceeds to S51, while if the response signal is received (Yes in S6), the process proceeds to S61. If neither the key code nor the response signal is received, the process is terminated here.

What is claimed is:

1. A remote control engine starting device for a vehicle for starting an engine when an engine start command is given from a remote location comprising: a remote commander; a remote engine starter; and an immobilizer, wherein said remote engine starter comprises an engine start signal outputting section which outputs an engine starting signal, and a code outputting section which in response to an interrogating signal output from said immobilizer, outputs a remote engine starter code preregistered in said remote engine starter, said immobilizer comprises an interrogating signal outputting section which outputs an interrogating signal upon receiving an engine starting signal output from said remote engine starter, and an engine start permitting section which outputs an engine start permitting signal, wherein when said remote engine starter receives a remote engine start signal from said remote commander, said engine start signal outputting section outputs said engine starting signal to said immobilizer, said interrogating signal outputting section outputs, in response to said engine starting signal, said interrogating signal to said remote engine starter when a remote engine starter verifying code is registered in said immobilizer, said code outputting section outputs said remote engine starter code to said immobilizer in response to said interrogating signal, and when a remote engine starter code matches said remote engine starter verifying code, said immobilizer outputs an engine start permitting signal, and wherein said remote engine starter receives said interrogating signal for a second time when said remote engine starter code is not output or said remote engine starter code does not match said remote engine starter verifying code, and said engine start permitting signal is output when said interrogating signal is no longer received for a predetermined time.

2. A remote control engine starting device for a vehicle as claimed in claim 1, wherein when a remote commander code transmitted from said remote commander matches a remote commander verifying code preregistered in said remote engine starter, said engine start signal outputting section of said remote engine starter outputs said engine starting signal.

3. A remote control engine starting device for a vehicle as claimed in claim 2, wherein said remote engine starter code and said remote commander verifying code are the same code.

4. A remote control engine starting device for a vehicle as claimed in claim 2, wherein said remote engine starter code and said remote commander verifying code are different codes.

5. A remote control engine starting device for a vehicle as claimed in claim 1, wherein said immobilizer further comprises an activation signal outputting section which outputs an activation signal to a key cylinder upon receiving said engine starting signal, and wherein said engine start permitting section outputs said engine start permitting signal when a key code which is output from an IG key in response to said activation signal matches a preregistered code in said immobilizer, and said interrogating signal outputting section outputs said interrogating signal to said remote engine starter when it receives said engine starting signal but said IG key is not inserted.

6. A remote control engine starting device for a vehicle as claimed in claim 1, wherein said immobilizer further comprises an activation signal outputting section which outputs an activation signal to a key cylinder upon receiving said engine starting signal, and wherein said engine start permitting section outputs said engine start permitting signal when a key code which is output from an IG key in response to said activation signal matches a preregistered code in said immobilizer, and said interrogating signal outputting section outputs said interrogating signal to said remote engine starter when it does not receive said key code in response to said activation signal.

7. A remote control engine starting device for a vehicle for staffing an engine when an engine start command is given from a remote location comprising: a remote engine starter; and an immobilizer, wherein said immobilizer comprises an activation signal outputting section which outputs an activation signal to a key cylinder upon receiving an engine starting signal from an IG key, an interrogating signal outputting section which outputs an interrogating signal to said remote engine starter upon receiving an engine starting signal from said remote engine starter, and an engine start permitting section which outputs an engine start permitting signal, wherein said remote engine starter comprises an engine start signal outputting section which outputs said engine starting signal and a code outputting section which outputs a remote engine starter code preregistered in said remote engine starter in response to said interrogating signal which is output from said immobilizer, wherein said immobilizer outputs an activation signal and said interrogating signal upon receiving said engine starting signal, determines whether or not a key code matches a preregistered code in said immobilizer upon receiving said key code output in response to said activation signal, and determines whether or not said remote engine starter code matches said preregistered code in said immobilizer, when said immobilizer receives a remote engine starter code output in response to said interrogating signal, wherein said engine start permitting section outputs an engine start permitting signal when said remote engine starter code matches said preregistered code in said immobilizer, and wherein said immobilizer outputs said activation signal upon receiving said engine starting signal from said IG key, and outputs said interrogating signal to said remote engine starter when it does not receive said key code output in response to said activation signal.

8. A remote control engine starting device for a vehicle as claimed in claim 1, wherein said engine start permitting section does not output said engine start permitting signal when said remote engine starter code has failed to match said remote engine starter verifying code a predetermined number of times.

* * * * *

UNITED STATES PATENT AND TRADEMARK OFFICE
CERTIFICATE OF CORRECTION

PATENT NO. : 7,298,058 B2
APPLICATION NO. : 10/754009
DATED : November 20, 2007
INVENTOR(S) : Manabu Matsubara et al.

It is certified that error appears in the above-identified patent and that said Letters Patent is hereby corrected as shown below:

On the Title Page

Item (57) Abstract, line 2        Delete "staring",
                                            Insert --starting--

Column 14, line 10, Claim 7      Delete "staffing",
                                            Insert --starting--

Signed and Sealed this

Twelfth Day of August, 2008

JON W. DUDAS
*Director of the United States Patent and Trademark Office*